(12) United States Patent
Clapper

(10) Patent No.: US 7,515,137 B2
(45) Date of Patent: Apr. 7, 2009

(54) SOFTWARE-BASED NUMBER LOCK

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1562 days.

(21) Appl. No.: 09/906,343

(22) Filed: Jul. 16, 2001

(65) Prior Publication Data

US 2003/0011571 A1    Jan. 16, 2003

(51) Int. Cl.
*G09G 5/00* (2006.01)
(52) U.S. Cl. .......................... 345/168; 341/22
(58) Field of Classification Search ................ 345/168, 345/167, 157, 156, 169, 173; 379/93.17, 379/93.23; 713/150, 184; 715/504–508, 715/202, 808; 341/22; 710/12, 14; 400/485, 400/491.3, 486; 434/227; 361/686; 700/66; 382/189
See application file for complete search history.

(56) References Cited

U.S. PATENT DOCUMENTS

| | | | | |
|---|---|---|---|---|
| 5,193,121 A * | 3/1993 | Elischer et al. | ............. | 382/138 |
| 5,276,794 A * | 1/1994 | Lamb, Jr. | ..................... | 715/507 |
| 5,459,796 A * | 10/1995 | Boyer | ......................... | 382/187 |
| 5,704,029 A * | 12/1997 | Wright, Jr. | .................. | 715/505 |
| 5,805,158 A * | 9/1998 | Bertram et al. | ............. | 715/764 |
| 5,905,486 A * | 5/1999 | Brittenham et al. | ......... | 345/157 |
| 6,281,812 B1 * | 8/2001 | Kim | ............................ | 341/23 |
| 6,324,516 B1 * | 11/2001 | Shults et al. | .................... | 705/2 |
| 6,426,742 B1 * | 7/2002 | Tai | .............................. | 345/168 |
| 6,445,381 B1 * | 9/2002 | Chou | ......................... | 345/168 |
| 6,460,042 B1 * | 10/2002 | Hitchcock et al. | ............. | 707/10 |
| 6,501,835 B2 * | 12/2002 | Miller | .................... | 379/100.01 |
| 6,618,425 B1 * | 9/2003 | Carlesi et al. | ............... | 372/109 |

* cited by examiner

*Primary Examiner*—Abbas I Abdulselam
(74) *Attorney, Agent, or Firm*—Trop, Pruner & Hu, P.C.

(57) ABSTRACT

A keyboard number lock may be automatically transitioned in response to the detection of the selection of a text entry box. In particular, when a text entry box is selected, the keyboard may automatically be transitioned to the number lock state to provide numerical entries when particular keys are operated.

18 Claims, 3 Drawing Sheets

SOFTWARE-BASED NUMBER LOCK

BACKGROUND

This invention relates generally to implementing a number lock in connection with a numerical keypad on processor-based systems.

Processor-based systems may include a keyboard including a numeric keypad that operates in one of two modes. In the numerical mode, operating the keys provides numerical inputs. In the non-numerical mode or pointing mode, operating the buttons provides cursor control signals. Generally, the mode is selected through a separate key usually called the "NUM LOCK" key. The user operates the NUM LOCK key to select between the two modes.

Many users find this operation confusing because they are not sure which mode they are in at any time. Thus, some users become confused when they get numerical or pointing outputs that they did not expect.

Because of this confusion, it is believed that the use of the numeric keypads on conventional keyboards is greatly diminished. Considerable economies of operation could be achieved by entering numbers using a convenient numeric keypad similar to that available on 10-key calculators.

Thus, there is a need for better ways to control the selection between numerical and non-numerical modes of operation of keypad sections.

DETAILED DESCRIPTION

Figure 1:
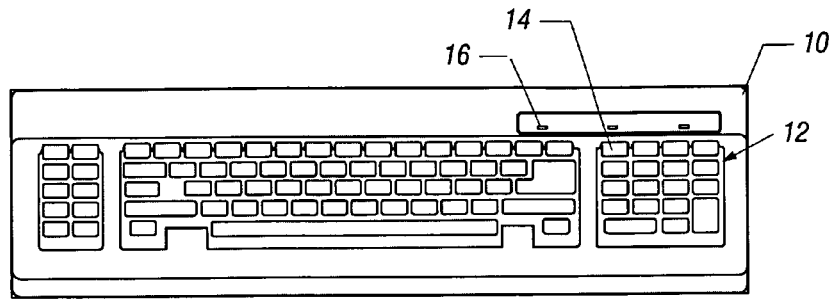
FIG. 1 is a front elevational view of a keyboard in accordance with one embodiment of the present invention.

Referring to FIG. 1, a keyboard 10 may include a numeric keypad section 14 that includes a plurality of keys 12. Each key 12 may be assigned to a particular number. That is, when each key 12 is operated, a numerical entry is received by a connected processor-based system. In addition, many of the same keys 12 also function in a non-numerical mode to provide cursor command signals, such as page-up signals, page-down signals, home signals, end commands, and delete commands.

The selection between the numeric and non-numeric modes may be controlled by a NUM LOCK key 14. A light indicator 16 indicates whether the NUM LOCK is on or off.

Figure 2:
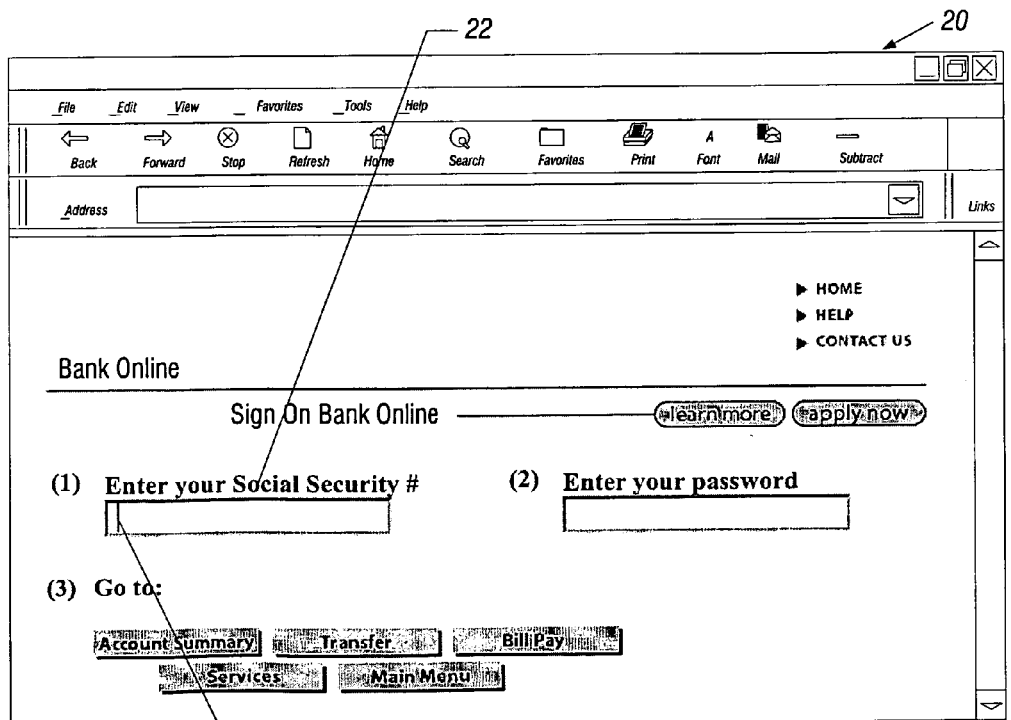
FIG. 2 is a graphical user interface in accordance with one embodiment of the present invention.

Referring to FIG. 2, a conventional web page graphical user interface 20 may include a plurality of text entry or dialog boxes 22 for the entry of information. When the user wishes to enter the information in a text entry or dialog box 22, the user may operate the NUM LOCK key 14 to place the processor-based system in the numeric entry mode and may then operate the appropriate keys 12, for example to enter the user's social security number.

Alternatively, the system may automatically detect that a text entry or dialog box 22 has been selected for text entry and based on that selection may automatically place the keyboard 10 in the numeric mode. For example, when the cursor 26 is placed in the box 22, the keyboard 10 may be automatically placed in the numeric mode. In such case, it is not necessary to operate the NUM LOCK key 14 to select numerical entries.

Figure 3:
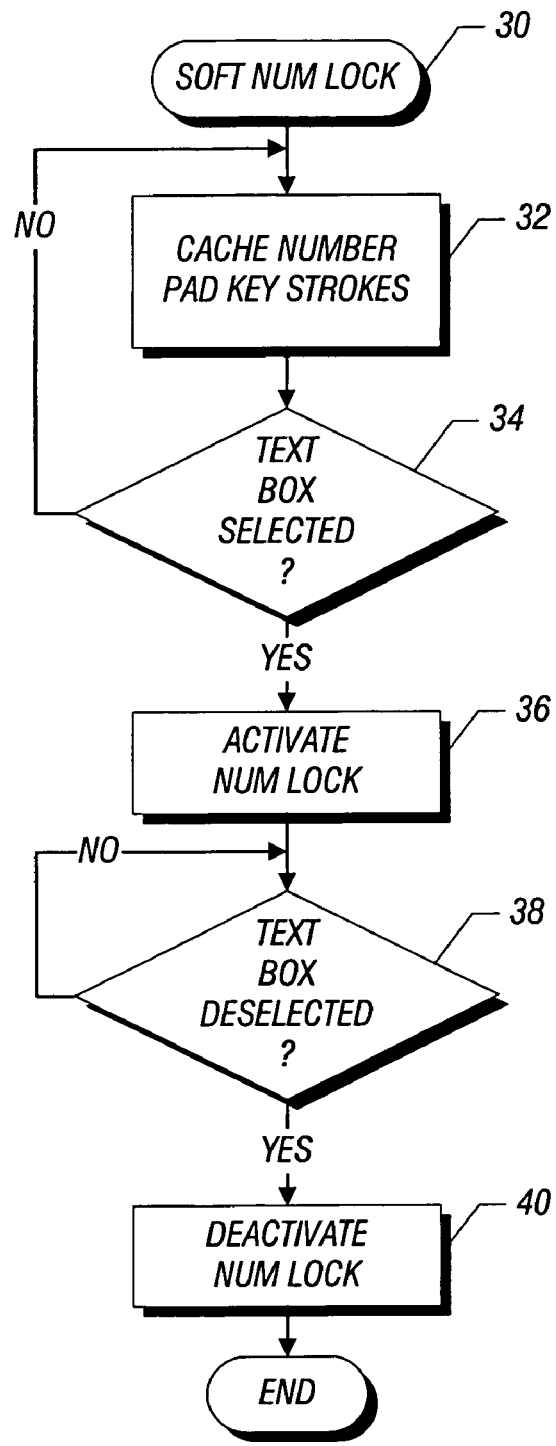
FIG. 3 is a flow chart in accordance with one embodiment of the present invention.

Referring to FIG. 3, the software 30 stored in association with a coupled processor-based system may initially cache the number pad key strokes as indicated in block 32. For example, a storage system may be utilized to temporarily store the operation of any of the keys 12 in the numeric keypad section. If a text entry box 22 is selected, as determined in diamond 34, the keys 12 are automatically placed in the numeric mode as indicated in block 36. If the text entry box 22 is deselected, the mode is automatically changed back to the non-numeric mode in one embodiment. The selection of the text entry box 22 may be detected by placing the cursor 26 in the text entry box 22 for example.

When it is detected that the text entry box 22 has been deselected, the NUM LOCK may be automatically deactivated as indicated in block 40. In some embodiments, the selection may then be overridden by manually operating a NUM LOCK key or not, as the case may be.

Figure 4:
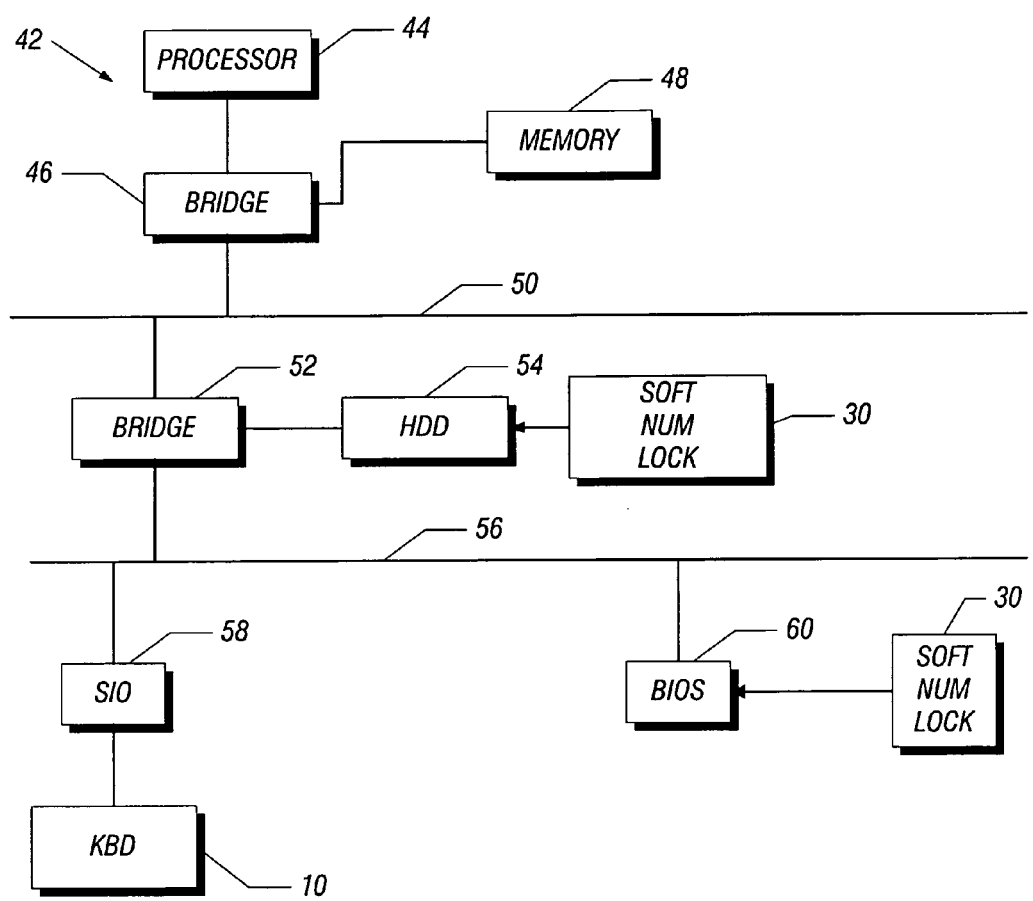
FIG. 4 is a schematic depiction of one embodiment of the present invention.

Referring to FIG. 4, a processor-based system 42 may include a processor 44 coupled to a bridge 46. The bridge 46 in the illustrated embodiment is in turn coupled to a memory 48 in a bus 50.

The bus 50 may be coupled to a bridge 52 in an illustrated embodiment that in turn couples to a hard disk drive (HDD) 54. The bridge 52 may also be coupled to a legacy bus 56 in one embodiment. Continuing in that embodiment, the bus 56 may also be coupled to a serial input/output (SIO) device 58 that couples to the keyboard 10. The bus 56 may also be coupled to a basic input/output system (BIOS) 60.

While the architecture illustrated in FIG. 4 is illustrative only and is not in any way meant to limit the present invention, it is useful in illustrating that the NUM LOCK software 30 may be stored on the hard disk drive 54 in one embodiment. Alternatively, the NUM LOCK software 30 may be stored as part of the basic input/output (BIOS) system 60. As still another alternative, the NUM LOCK software 30 may be stored as a routine that is part of an operating system to provide still another example.

In some embodiments, the NUM LOCK setting may be changed in hardware. As a result, the NUM LOCK indicator 16 may change indications. In other cases, in response to detection of a selection of a text entry box, the characters which are displayed may be transitioned to numerical characters automatically without actually changing the setting of the NUM LOCK or the indicator 16. Instead, the software simply recognizes the entries as numeric entries and displays numeric characters without affecting the NUM LOCK state. Thus, there is no need to return from one state to another. Once the software no longer detects the selection of a text entry box, it can thereafter interpret any entries according to the NUM LOCK state which has not changed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting a selection of a text entry box; and
   in response to the detection of a selection of a text entry box, automatically recognizing a moveable keystroke from a numeric keypad section of a keyboard with moveable keys as numeric key entry, said recognizing without user movement of another moveable key on the keyboard, and automatically, in response to said recognizing, initiating a numeric mode of the keyboard wherein keystrokes are recognized as numeric entries rather than cursor controls, the numeric keypad section including a plurality of moveable number keys arranged in rows and columns.

2. The method of claim 1 wherein automatically recognizing certain key entries as numeric key entries includes automatically recognizing, in software, the certain key entries as numeric key entries without changing a state of a keyboard number lock when the selection of a text entry box is detected.

3. The method of claim 1 wherein detecting the selection of a text entry box includes detecting placement of a cursor in a text entry box prior to entering information in the text entry box.

4. The method of claim 3 including caching keystrokes to enable entry of numeric information in said text entry box upon detecting the selection of the text entry box.

5. The method of claim 3 including detecting the removal of the cursor from the text entry box and in response, automatically recognizing the certain key entries as non-numeric key entries.

6. The method of claim 1 wherein automatically recognizing certain key entries as numeric key entries includes automatically changing a state of a keyboard number lock, in hardware, to a numeric entry mode.

7. An article comprising a medium storing instructions that enable a processor-based system to:
   detect selection and deselection of a text entry box based on cursor placement in or out of the text entry box respectively; and
   in response to the detection of the selection of the text entry box, automatically place a numeric keypad section of a keyboard in a numeric mode, and in response to the detection of the deselection of the text entry box automatically place the keypad section in a cursor control mode, the automatic placement of the keypad section in the numeric mode without user operation of a key on the keyboard.

8. The article of claim 7 further storing instructions that enable a processor-based system to automatically change a state of a keyboard number lock in response to the detection of the selection of a text entry box.

9. The article of claim 8 further storing instructions that enable the processor-based system to automatically change the state of the keyboard number lock to a non-numeric entry mode in response to the deselection of a text entry box.

10. The article of claim 8 further storing instructions that enable the processor-based system to receive a web page including a text entry box and automatically change the state of a keyboard number lock in response to the selection of the text entry box.

11. The article of claim 7 further storing instructions that enable a processor-based system to detect the placement of a cursor in a text entry box prior to entering information in the text entry box.

12. The article of claim 7 thither storing instructions that enable the processor-based system to cache key strokes to enable entry of numeric information in said text entry box upon detecting the selection of the text entry box.

13. A processor-based system comprising:
   a processor;
   a keyboard coupled to the processor, the keyboard having a numeric keypad section with a plurality of keys that selectably function in a numeric entry mode or a non-numeric entry mode, the keyboard also having a mode-controlling key that, if actuated, causes the plurality of keys to selectably function in the numeric entry mode; and
   a storage coupled to said processor, said storage storing instructions that enable the processor to detect selection of a text entry box and in response to the detection of a selection of a text entry box, to recognize a moveable keystroke as numeric entries without user movement of the mode-controlling key, and automatically, in response to said recognizing, transition to a numeric mode of the keyboard wherein keystrokes are recognized as numeric entries rather than cursor controls, the numeric keypad section including a plurality of moveable number keys arranged in rows and columns.

14. The system of claim 13 wherein said storage stores instructions that enable the processor to detect placement of a cursor in a text entry box as an indicator of the selection of the text entry box.

15. The system of claim 13 wherein said storage stores instructions that enable the processor to cache key strokes to enable entry of numeric information in said text entry box upon detecting the selection of the text entry box.

16. The system of claim 13 wherein said storage stores instructions to automatically change a state of the keyboard number lock in response to the detection of the selection of a text entry box.

17. The system of claim 16 wherein said storage stores instructions that enable the processor to automatically change the state of the keyboard number lock to a numeric entry mode in response to the detection of the selection of the text entry box.

18. The system of claim 16 wherein said storage stores instructions that enable the processor to detect deselection of a text entry box and in response, automatically change the state of a keyboard number lock, said detection of deselection based on removal of a cursor from the text entry box.

* * * * *